US008113135B2

(12) United States Patent
Catherin et al.

(10) Patent No.: US 8,113,135 B2
(45) Date of Patent: Feb. 14, 2012

(54) DEVICE FOR CLOSING A FUSELAGE CONNECTED TO A TOWED SUBMARINE OBJECT AND THE APPLIANCE THUS EQUIPPED

(75) Inventors: Samuel Catherin, Toulon (FR); Sylvain Leclercq, Marseilles (FR)

(73) Assignee: Sercel, Carquefou (FR)

( * ) Notice: Subject to any disclaimer, the term of this patent is extended or adjusted under 35 U.S.C. 154(b) by 821 days.

(21) Appl. No.: 12/134,863

(22) Filed: Jun. 6, 2008

(65) Prior Publication Data
US 2009/0025622 A1    Jan. 29, 2009

(30) Foreign Application Priority Data
Jun. 7, 2007  (FR) ...................................... 07 04082

(51) Int. Cl.
*B63B 21/66*    (2006.01)
(52) U.S. Cl. ...................................................... 114/244
(58) Field of Classification Search .......... 114/243–245; 441/133; 367/15–24; 405/114–224.4; 220/811; 206/262
See application file for complete search history.

(56) References Cited

U.S. PATENT DOCUMENTS

| | | | |
|---|---|---|---|
| 3,165,225 A | 1/1965 | Reitzel | |
| 4,711,194 A | 12/1987 | Fowler | |
| 5,529,011 A | 6/1996 | Williams, Jr. | |
| 6,144,342 A * | 11/2000 | Bertheas et al. | 343/709 |
| 6,525,992 B1 * | 2/2003 | Olivier et al. | 367/17 |
| 2005/0268835 A1 | 12/2005 | Le Page et al. | |
| 2006/0254490 A1 | 11/2006 | Ryan et al. | |
| 2008/0017094 A1 | 1/2008 | Leclercq et al. | |

FOREIGN PATENT DOCUMENTS

| | | |
|---|---|---|
| EP | 1 426 787 A2 | 6/2004 |
| EP | 1 426 787 A3 | 3/2007 |
| FR | 2 870 509 | 11/2005 |
| FR | 2 903 655 | 1/2008 |

* cited by examiner

*Primary Examiner* — Ed Swinehart
(74) *Attorney, Agent, or Firm* — Patterson Thuente Christensen Pedersen, P.A.

(57) ABSTRACT

A device for selectively opening and closing a fuselage coupled to a towed submarine object. The device comprises first and second shells articulatable with respect each other by a hinge assembly. A releasable locking system locks the shells on each other. Hinge members of the hinge assembly are slidable with respect to each other along the articulation axis of the shells in order to actuate the locking or unlocking of these shells.

17 Claims, 6 Drawing Sheets

DEVICE FOR CLOSING A FUSELAGE CONNECTED TO A TOWED SUBMARINE OBJECT AND THE APPLIANCE THUS EQUIPPED

RELATED APPLICATION

The present application claims priority to French Application No. 07 04082 filed Jun. 7, 2007, which is incorporated herein in its entirety by reference.

TECHNICAL FIELD

The invention concerns in particular a device for closing a fuselage connected to a towed submarine object, in particular a linear acoustic antenna comprising sections, at least some of which are connected in pairs by electronic junction modules.

The fuselage includes an axis parallel to that along which the submarine object roughly extends and will comprise first and second shells. Typically, the device will be integrated in a submarine appliance adapted, submerged and moving, to stabilize the position of one or more such towed objects.

BACKGROUND ART

Such a submarine appliance is described in U.S. Application Publication No. 2005-0268835 to Le Page et al. and U.S. Pat. No. 4,711,194 to Fowler, both of which are incorporated herein by reference in their entireties.

A submarine appliance fuselage is known from U.S. Pat. No. 4,711,194, comprising means for articulating the first and second shells on each other, between respectively open and closed states, on an axis substantially parallel to the axis of the fuselage, and locking means for retaining the shells in a dischargeable manner in the closed state.

However, the fuselages disclosed in the references as indicated above have drawbacks. In particular, they are not practical to manipulate out of the water, when it is necessary to work on them, or on the appliance that may carry them; the appliance that carries them is also typically provided with a current source (internal or external) situated in a bothersome protrusion; and/or there must be several available tools for manipulating the shells, and in particular opening the one that defines the opening one for accessing the inside of the fuselage.

SUMMARY OF THE INVENTION

A device according to embodiments of the invention provides a solution to at least some of the above-mentioned drawbacks. In one embodiment of the invention, the device includes a locking assembly released by sliding along at least one of an axis substantially parallel to an articulation axis of the shells and the axis of the fuselage. Such a closure device, according to another aspect of the invention, can be used with an appliance of the aforementioned type, the appliance comprising a fuselage assembled movable in rotation about one of the electronic junction modules and comprising first and second shells, and at least one wing assembled movable in rotation with respect to the fuselage.

In one embodiment of the invention, several wings are provided, and the pivoting of some of these wings is controlled by at least one electric motor functioning by means of batteries housed in the electronic junction module surrounded by the fuselage. The wings can also be assembled so as to be removable.

Other characteristics and advantages of the invention will also emerge from the following description, which presents a preferred embodiment.

DETAILED DESCRIPTION OF THE DRAWINGS

Figure 1:
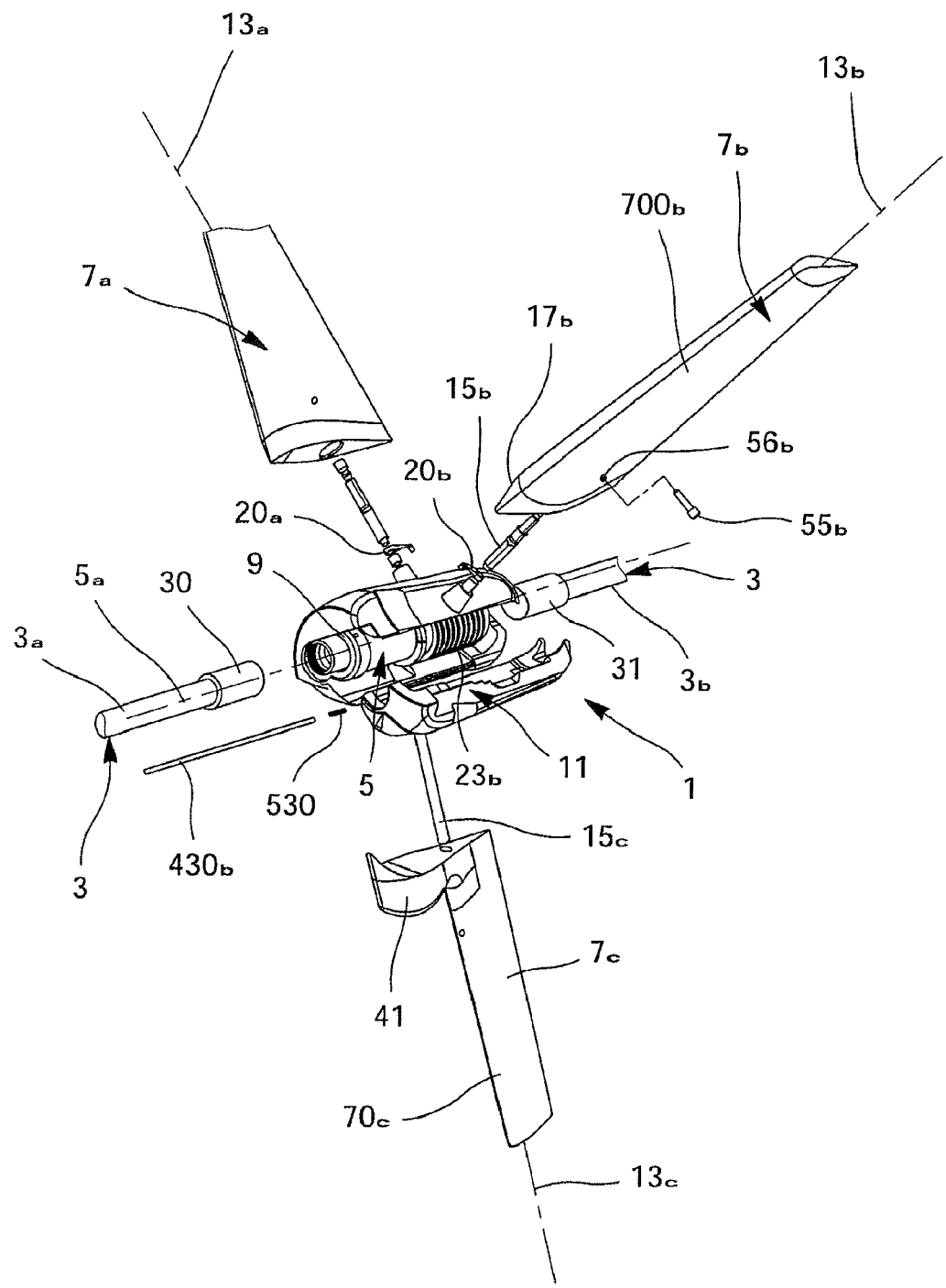
FIG. 1 is an exploded perspective view depicting an antenna-stabilizing submarine appliance provided with a closure device according to an embodiment of the invention.

Referring to FIG. 1, a submersible appliance 1, often referred to as a "bird" is illustrated. Submersible appliance 1 is used in FIG. 1 for correctly positioning and supporting a towed submarine object, such as, for example, a towed linear acoustic antenna 3.

Appliance 1 can comprise a hollow central body 5, and one or more stabilizer fins or wings extending radially around it. In one embodiment of the invention, appliance 1 comprises three wings 7a, 7b, 7c that are individually angularly positionable.

Body 5 has a longitudinal axis 5a corresponding to a roll axis of appliance 1. Body 5 comprises a central junction module 9 and a concentric fuselage or outer shell 11 mounted for possible relative rotation, about axis 5a, so that in the event that they encounter an obstacle, the wings can thus escape it laterally by rotating or pivoting about axis 5a, with fuselage 11.

In one embodiment, such modules 9, enclosing the electronics, are interposed from place to place along the towed object, such as antenna 3. Antenna 3 can comprise, for example, a series of sections, such as 3a, 3b, illustrated in FIG. 1, coupled together by connectors 30, 31 provided at each end of module 9.

On each appliance 1, wings 7a-7c pass through corresponding fuselage 11, along an axis transverse or radial to axis 5a, around corresponding junction module 9. Wings 7a-7c can be assembled so as to pivot individually about a pivot extending along their respective transverse rotation axes, 13a, 13b, 13c.

In FIG. 1, it can be seen that, in order to obtain these movements, each wing is fastened or fixed in the vicinity of its root, such as root 17b for wing 7b, to a pivot shaft, such as shaft 15b extending along radial axis 13b for wing 7b.

Figure 3:
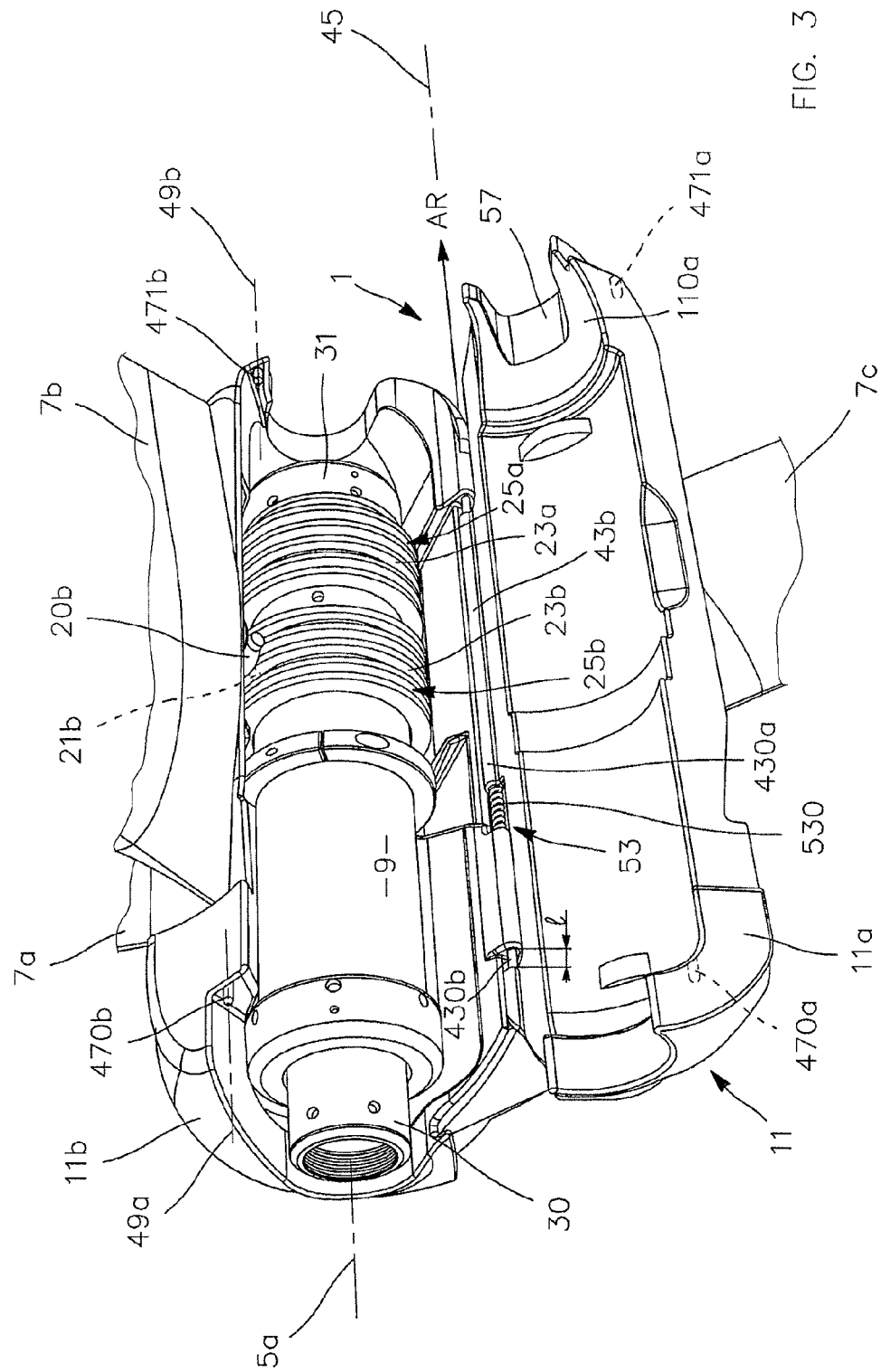
FIG. 3 is a perspective view depicting an open fuselage according to an embodiment of the invention.
Figure 6:
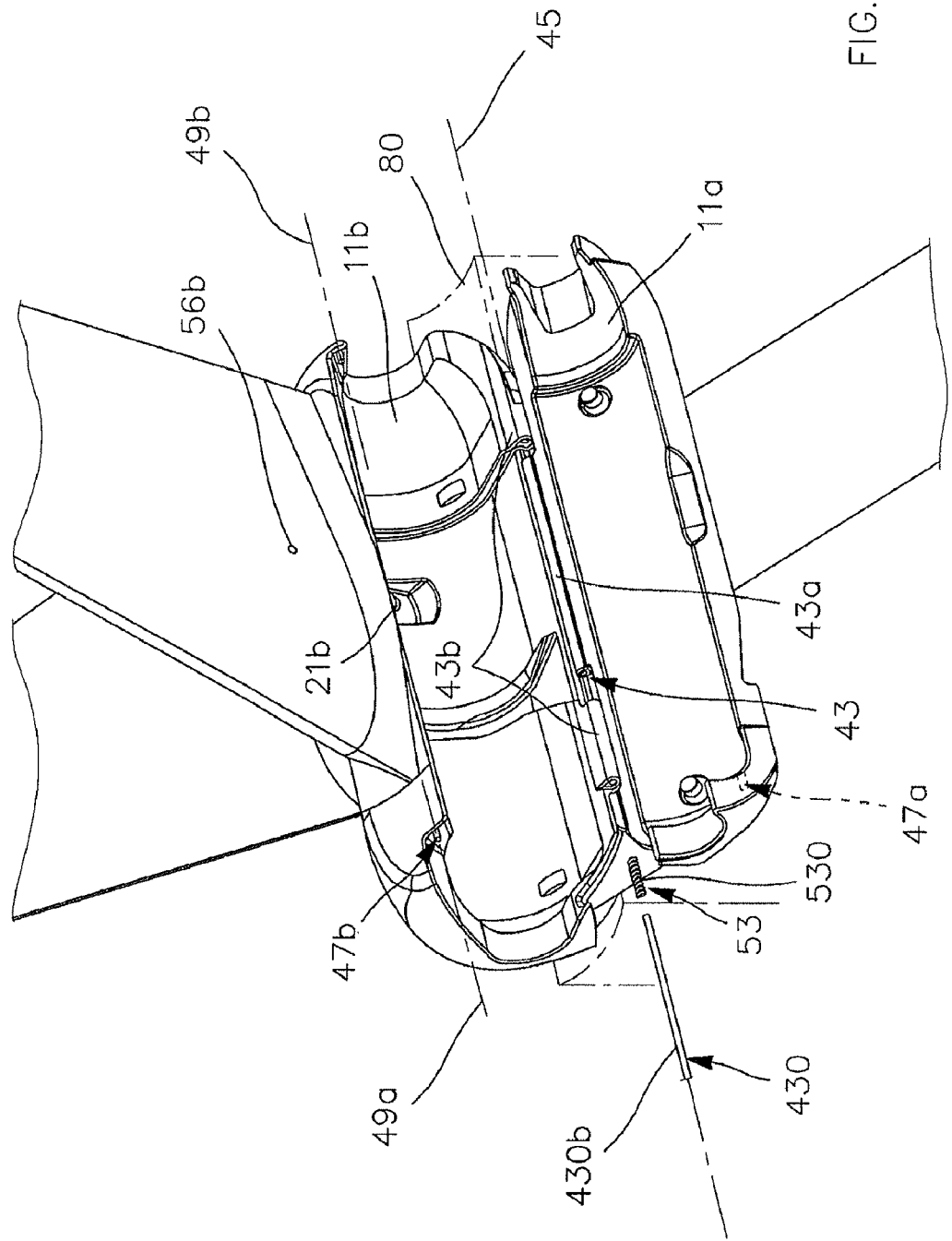
FIG. 6 is an exploded view depicting a fuselage according to an embodiment of the invention.

Shafts 15a, 15b of motorized wings 7a, 7b passes through fuselage 11, under which it is coupled to a transverse lug 20a, 20b provided with a toe or tab, such as toe 21b for rotating lug 20b. Toe 21a, 21b slides in a notch or groove, such as helical groove, respectively 23a, 23b, in a ring, respectively 25a, 25b, as illustrated in FIGS. 1, 3, 6 in particular.

Details of the assembly of motorized wings 7a, 7b are disclosed in French Publication No. 2,870,509, entitled "Arrangement for Steering a Towed Submerged Object" to Le Page et al., which is incorporated herein by reference in its entirety, corresponding to FIGS. 2 to 5 of this application.

Figure 4:
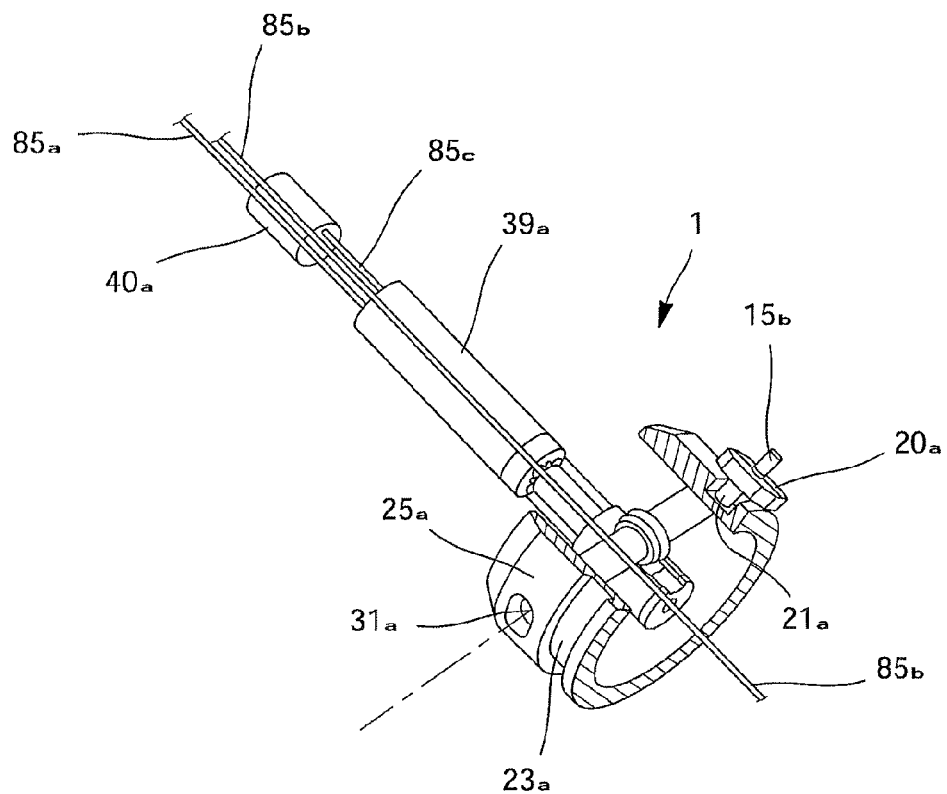
FIG. 4 depicts part of the interior of a module according to an embodiment of the invention, the module having a system for rotational control of the wings in response to actuators, such as motors.

FIG. 4 depicts that, inside module 9, each ring 25, such as 25a, has two diametrically opposed holes passing through it, in each of which a finger, such as 31a, moves. Each finger can be an element of a radial device having a cam (or an eccentric) moved by a return angle controlled by the output shaft of an electric motor, for example referenced 39a in FIG. 4 for the system controlling wing 7a. Each shaft can be controlled by a geared motor.

Figure 7:
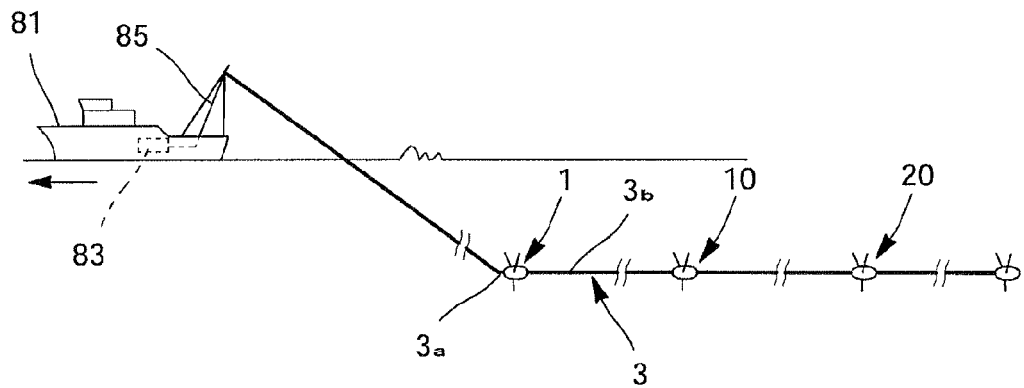
FIG. 7 is a schematic depicting a towed antenna, according to an embodiment of the invention.

The electrical supply to this or each motor of appliance 1, as well as the onboard electronics, such as, for example, on certain junction modules 9, electronics serving as a relay or repeater for the signal conveyed in the antenna, will be provided, in normal operation, from a surface vessel, and favourably from towing vessel 81, illustrated in FIG. 7. In FIG. 7, vessel 81 comprises a source of electrical power 83, which, through a cable 85, transmits this power as far as towed linear acoustic antenna 3, the submerged position of which is controlled by a series of submerged appliances 1, 10, 20 . . . , which may be of the same type.

In shown in FIG. 4, cable 85a connected to electrical power source 83 supplies power to at least motor 39a. Typically, it can also serve for the other motors of this appliance and for the control, from the vessel 31, of the electronic means contained in the appliance. The other supply and control cables for the other appliances have not been shown in order not to overload the figure.

Cable 85b can serve for the transmission to vessel 81 of the seismic data recorded by the antenna 3. Cable 85b passes from one antenna section to the following section and also extends along the tractor cable 85.

Cable 85c serves for the backup electrical supply, via onboard battery 40a which, in the event of deficiency of electrical power source 83, will electrically supply in particular the electronics and the motor or motors of appliance 1. The other appliances will preferably also be provided with at least one onboard backup battery.

It should be noted that these characteristics of electrical connection/supply and data transmission to and from the surface, via in particular the towing vessel (or even an assistance vessel), could be implemented independently of numerous other characteristics presented here moreover, such as in particular the system of locking/unlocking the fuselage or the dismantle character of the wings.

Thus, on each appliance, the rotation of motorized wings 7a and 7b, can each be controlled by an electric motor functioning normally from a surface supply, i.e. vessel 81 and, in emergency, by one or more batteries housed in the corresponding junction module 9.

Such a control system does not exist for wings 7c, therefore called the "free wing". In one embodiment of the invention, radial shaft 15c can simply pass through the fuselage 11 while being held axially therein. In another embodiment, the spindle of wing 73 is fixed to fuselage 11 such that the pivoting of fuselage 11 will be effected in the wing.

Wing 7c is ballasted. Design details for ballasted wing 7c are discloses in French Application No. 06 06 453, entitled "Dynamic Stabilization Device for a Submarine Vehicle" to LeClercq et al., which is incorporated herein by reference in its entirety.

Figure 2:
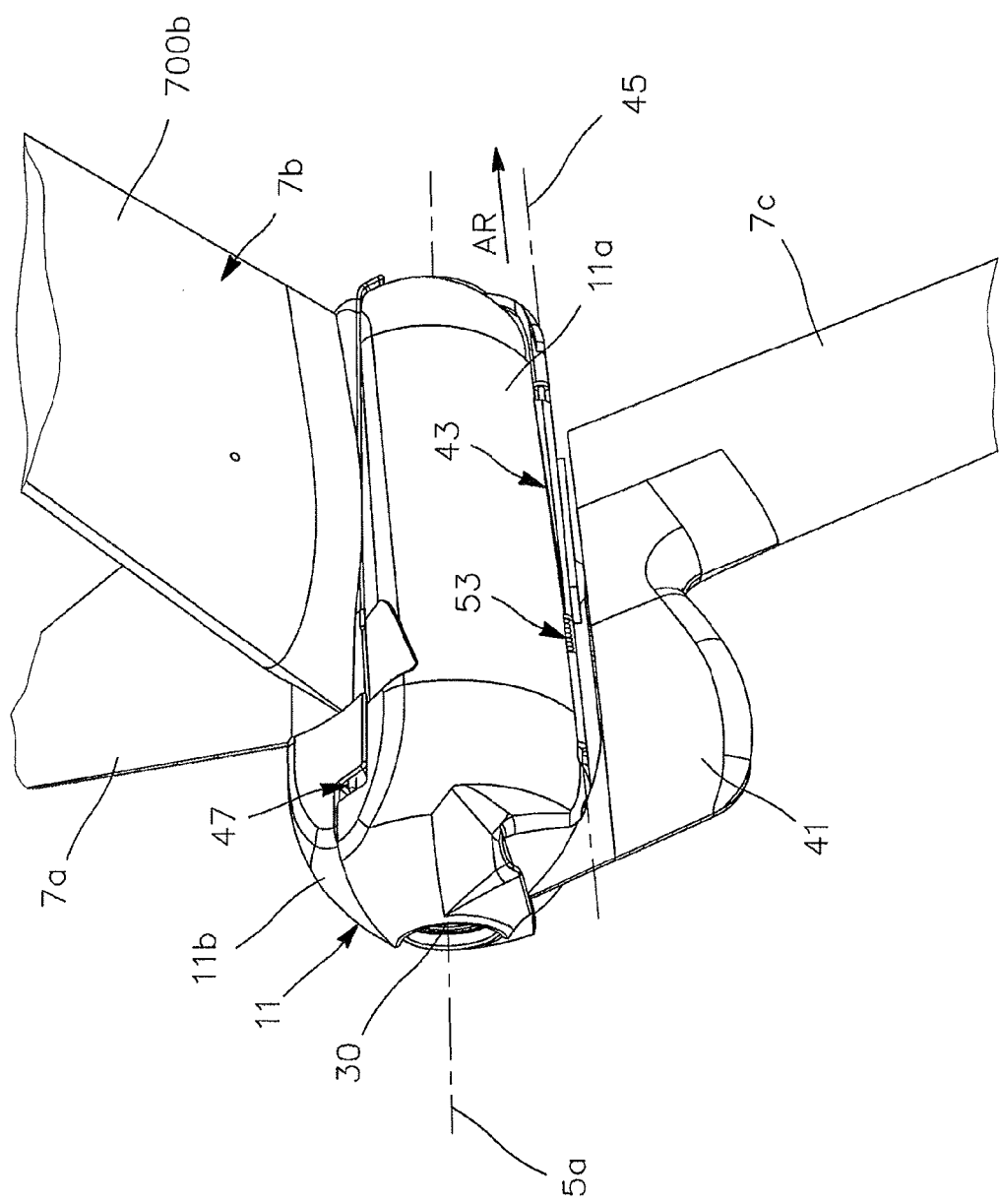
FIG. 2 is a perspective view depicting a fuselage according to an embodiment of the invention.

In FIGS. 1, 2, it can be seen that a ballast 41 can be assembled on appliance 1, for example, on wing 7c.

In general terms, this ballast 41 will be situated with respect to the wing on which it will act so that, appliance 1 advancing in a direction of movement substantially coinciding with roll axis 5a, a roll inclination of wing 7a would cause it to pivot about its axis, here 13c, such that its leading edge, here 70c, is then oriented naturally so as to cause an effect that will tend to return it towards the angular reference position of appliance 1, therefore corresponding to a reduced roll.

Fuselage 11 can comprise first and second shells, respectively 11a, 11b. These shells 11a and 11b are articulated on each other by at least one hinge 43 extending, in the figures, along an articulation axis 45 parallel to axis 5c of fuselage 11, between respectively open and closed states or positions.

Hinge 43 can comprise first and second hinge members 43a, 43b, assembled respectively on first and second shells 11a and 11b in order to connect them together.

In one embodiment of the invention, first shell 11a is smaller than second shell 11b, and first shell 11a defines the movable opening part of fuselage 11.

A releasable locking or inhibiting system 47 makes it possible to keep the fuselage closed. Releasable locking system 47 can comprise at least first and second complementary locking members 47a, 47b, assembled respectively on first and second shells 11a and 11b.

For their release by sliding from their closed state and here by hinged assembly 43, first and second shells 11a, 11b are assembled so as to axially slide with respect to each other, substantially parallel to axis 45, in two opposite directions. If shells 11a and 11b are closed, this axial sliding causes, in one direction, their interlocking and, in the opposite direction, their release.

Figure 5:
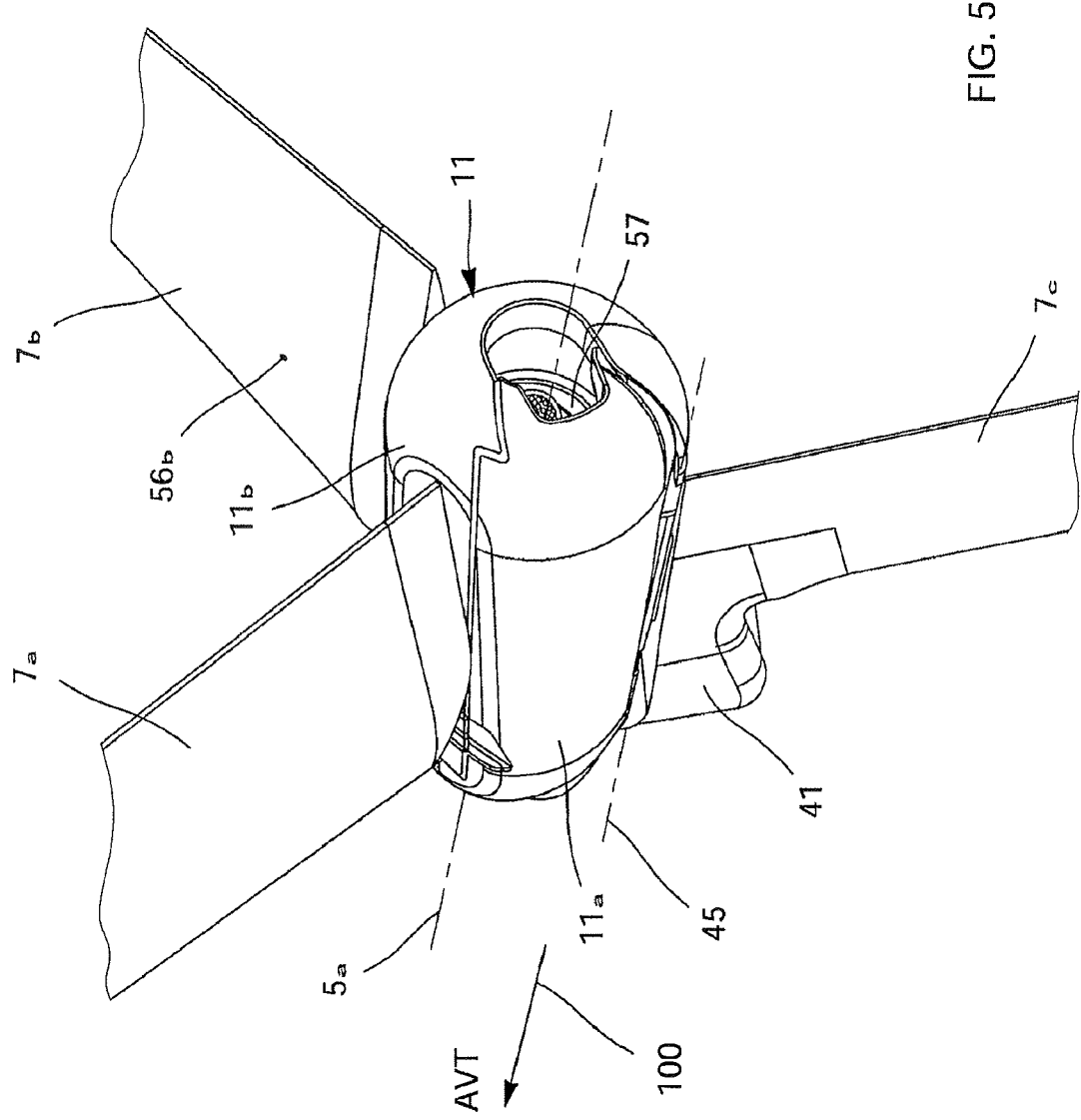
FIG. 5 is a perspective view depicting a closed fuselage according to an embodiment of the invention.

This causes a sliding between locking members, such as 47a, 47b, along (at least) one releasable locking axis, such as locking axis 49a, substantially parallel to articulation axis 45. This sliding thus takes place between a locked state, as depicted in FIG. 5, where said members of locking system 47 of each shell are engaged together, in the closed state of fuselage 11, preventing the articulation of shells 11a and 11b on each other, and therefore the opening of fuselage 11, and an unlocked state, depicted in FIGS. 2 and 3, where said members of locking system 47 are disengaged from each other, so as to allow the opening of fuselage 11 by articulation of shells 11a and 11b on each other.

In one embodiment of the invention, first and second hinge members 43a and 43b comprise respectively at least a first hollow hinge part 430a and at least one first rod 430b, both substantially parallel to articulation axis 45, and having between them an axial clearance 1.

In addition, locking system 47 can comprise at least one second hollow hinge piece 470a on one of shells 11a and 11b and at least one second rod 470b on the other of shells 11a and 11b, rod 470b being configured so as to be able to freely enter and leave hinge part 470a, according to the axial translation of hinge 43, with fuselage 11 closed.

In FIGS. 3, 6, a long straight rod 430b passes in particular through a long central hollow hinge piece 430a belonging to opening shell part 11a, in order to emerge laterally and be locked at its longitudinal ends in housings in second fixed shell 11b.

In the same figure, two straight rods 470b, 471b, parallel to axes 5a and 45, are also provided in association with two cooperating hollow hinge parts 470a, 471a, on the one hand towards the front of fuselage 11 and on the other hand towards the rear, offset angularly, such as, for example, at axes 49a, 49b.

For locking and unlocking, first rod or rods 430b and first hollow hinge part or parts 430a on the one hand and the second rod or rods 470b, 471b and second hollow hinge part or parts 470a, 471a, on the other hand, can be adapted so that a movement tending to move the (or each) first rod and first hollow hinge part with respect to each other causes a movement tending to make the (or each) second rod and second hollow hinge part enter together.

Stop members 51a, 51b limit the relative axial travel between the first rod and the first hollow hinge part.

Return member 53 naturally biases locking system 47 towards the locked state, with the opening shell part 11a closed. For reasons of compactness and efficacy, return member 53 can be assembled around the first rod and bias the opening shell part 11a towards the rear, as shown by arrow AR in FIGS. 2, 3.

In FIGS. 3, 6, return member 53 comprises a spring 530 assembled around rod 430b thus pushing opening shell part 11a into a naturally locked position.

Moreover, in order further to facilitate access to the inside of fuselage 11, for example, in order to work on module 9 situated below, the corresponding wing 7, or at least some of these wings, is/are assembled so as to be dismantle by means of releasable fixing assembly.

If each wing has a hollow external envelope, as referenced 700b for wing 7b in FIG. 1, the fixing assembly can be positioned between each envelope and the pivot shaft thereof, thus providing easy assembling and dismantling.

Thus in FIG. 1, for example, for wing 7b, a transverse pin 55b passes through a hole 56b in envelope 700b in order to dismantably engage in facing orifice 58b of shaft 15b, then engaged in this envelope along axis 13b.

For secure handling of opening shell 11a, it can be seen in FIG. 5 that at least one of the shells, and as depicted both, have, parallel to axis 5a of fuselage 11, a curved rear end. At this end, marked 110a for the opening shell 11a, there is presented a recess 57 accessible to fingers (typically two or three) around electronic module 9 in order to be able to push on shell 11a towards the front, in the direction of a disengagement of its locking with other shell 11b. For example, as depicted in FIG. 5, the front is marked AVT and the direction of advance of the appliance in the water is marked by the arrow 100.

With the hand in abutment against the rear of opening shell 11a, at the point of this recess 57, the operator will therefore be able to act axially counter to spring 530 and release fingers or rods 470b, 471b from their corresponding housings 470a, 471a.

In FIG. 5 in particular, it will have been noted that, in an embodiment with three wings 7a, 7b, 7c assembled in a trihedron, and in a position with two top wings 7a, 7b and a bottom wing 7c, each wing is assembled through second shell 11b and first shell 11a then defines a gate assembled between one of the top wings, such as 7b, and bottom wing 7c, for rotation with respect to second shell 11b.

In a position of fuselage 11 placed on a support 80, such as a cradle, allowing the opening of shells 11a and 11b, axis 45 is situated close to the bottom of fuselage 11, at the bottom of opening shell 11a, when the latter is closed, and locking assembly 47 is situated close to the top of fuselage 11, for natural opening by tilting downwards, once locking assembly 47 has been released. Opening shell 11a then remains naturally open, as illustrated in FIGS. 1, 3.

Work on module 9 is then practical, whether the wings are assembled or not, the provision of a single lower wing making it possible to be able to give the gate formed by shell 11a broad dimensions and a large angle.

Other types of appliances could be provided with the solutions disclosed above.

The release of locking system 47 and the articulation of shells 11a and 11b could take place more or less aslant with respect to the axis 5a up to an angle of approximately 20 degrees.

In addition, instead of assembling hinge 43 to slide "substantially axially", it could be thought to mount it fixedly and on the other hand to mount locking system 47 or each set of complementary locking members so as to slide with respect to each other. Thus rods 470b, 471b could be movable substantially along axis 5a. A common control bar actuatable by an operator could make it possible to separate them together from the housings, a return system, such as springs, relocking them naturally if, with the gate closed, the bar is released.

The invention claimed is:

1. A towed submarine object comprising a submersible fuselage for towing through water, the fuselage having a fuselage axis, the fuselage comprising:
   a first fuselage shell;
   a second fuselage shell;
   an articulation assembly adapted to articulate the first fuselage shell and the second fuselage shell with respect to each other between an open position and a closed position, along an articulation axis substantially parallel to said fuselage axis, wherein the first and second fuselage shells are operably coupled when positioned in the closed position to enable submersion and towing of the fuselage through water; and
   a locking system adapted to releasably retain said first and second fuselage shells in the closed position during submersion and towing of the fuselage,
   wherein an unlocking of the locking system is accomplished via sliding of the first and second fuselage shells along at least one sliding axis substantially parallel to one of said articulation axis and said axis of the fuselage, wherein the first fuselage shell and the second fuselage shell are articulated so as to axially slide with respect to each other substantially parallel to said articulation axis in opposite directions, and
   wherein when the first and second fuselage shells are in the closed position, a first sliding movement in a first direction results in a locked position of the first fuselage shell and the fuselage second shell, and a second sliding movement in a second opposite direction results in an unlocked position of the first fuselage shell and the second fuselage shell.

2. The towed submarine object according to claim 1, wherein in a closed position of the second fuselage shell on a support allowing the opening of the first fuselage shell, the articulation axis and the locking system are positioned respectively close to a bottom and a top of the fuselage, such that a natural opening of the fuselage is accomplished via a downward tilting of the first fuselage shell around said articulation axis, once said first fuselage shell has slid along the sliding axis so that the locking system is released and the first and second fuselage shells are in the unlocked position.

3. The towed submarine object according to claim 1, wherein the articulation assembly comprises a first hinge member and a second hinge member slidable with respect to each other along said articulation axis, respectively on the first and second fuselage shells.

4. The towed submarine object according to claim 1, wherein the articulation assembly comprises a first rod and a first hollow hinge part wherein a clearance is defined between the first rod and the first hollow hinge part along said articulation axis.

5. The towed submarine object according to according to claim 4, wherein the releasable locking system comprises a second rod and a second hollow hinge part, wherein shiftable between a locked state wherein the second rod is positioned within the second hinge part, and an unlocked state wherein the second rod is positioned outside of the second hinge part.

6. The towed submarine object according to claim 5, further comprising a stop assembly, wherein the stop assembly is adapted to limit a relative axial travel between the first rod and the first hollow hinge part, and wherein the first rod and first hollow hinge part on the one hand and the second rod and second hollow hinge part on the other hand are adapted so that a movement of the first rod and the first hollow hinge part along said articulation axis with respect to each other causes a movement of the second rod and the second hollow hinge part together.

7. The towed submarine object according to claim 1, further comprising a return assembly, wherein the return assembly biases the locking system towards a locked position.

8. The towed submarine object according to claim 4, further comprising a return assembly assembled around the first rod of the articulation assembly, wherein the return assembly biases the locking system towards a locked position.

9. The towed submarine object according to claim 1, comprising more than two wings, each wing having a rotation axis engaged through the second shell, and the first shell being located between two successive wings, with said articulation axis extending at a bottom part of the fuselage, when said first and second fuselage shells are closed with each other.

10. The towed submarine object according to claim 1, comprising a first central junction electronic module surrounded by said fuselage, said first central junction electronic module being provided with connecting means for being connected to a second central junction electronic module of said towed submarine object.

11. An appliance for controlling the navigation of a towed submarine object comprising a plurality of sections, wherein at least some of the plurality of sections are connected in pairs by electronic junction modules, the appliance comprising a fuselage rotatable around one of said electronic modules, and at least one wing rotatable with respect to the fuselage, said fuselage having a fuselage axis, the fuselage comprising:
   a first shell;
   a second shell;
   an articulation assembly adapted to articulate the first shell and the second shell with respect to each other between an open position and a closed position, along an articulation axis substantially parallel to said fuselage axis; and
   a locking system adapted to releasably retain said first and second shells in the closed position,
   wherein an unlocking of the locking system is accomplished via sliding along at least one sliding axis substantially parallel to one of said articulation axis and said axis of the fuselage, wherein the first shell and the second shell are articulated so as to axially slide with respect to each other substantially parallel to said articulation axis in opposite directions, and
   wherein when the fuselage is in the closed position, a first sliding movement in a first direction results in a locked position of the first shell and the second shell, and a second sliding movement in a second opposite direction results in an unlocked position of the first shell and the second shell.

12. The appliance according to claim 11, comprising a plurality of wings, wherein a rotation of at least some of the plurality of wings is controlled by at least one electric motor connected to a first power supply located on a towing vessel operably coupled to the appliance, and to a second backup power supply comprising batteries housed in at least one of said electronic junction modules.

13. The appliance according to claim 11, wherein said at least one wing is removably assembled to the fuselage by means of releasable fixing assembly.

14. The appliance according to claim 13, wherein the releasable fixing assembly is disposed between an envelope of said at least one wing and a central shaft operably coupled to the at least one wing such that the at least one wing is rotatable with respect to the fuselage.

15. The appliance according to claim 11, wherein the fuselage presents a front end and a rear end and the first shell presents, parallel to the fuselage axis, at least one curved rear end positioned at said rear end of the fuselage where a recess is defined, the recess being accessible to fingers of an operator, to allow the operator to push on said first shell in said second direction defining a frontward direction with respect to the fuselage, resulting in an unlocking between the first and second shells.

16. The appliance according to claim 11, comprising three of said wings positioned in a trihedron configuration, the trihedron configuration including two top wings and one bottom wing with respect to the fuselage, each wing having a rotation axis transverse to the second shell, and the first shell being positioned between one of the top wings and the bottom wing, wherein said articulation axis extends at a bottom part of the fuselage, when said first and second shells are in the closed position.

17. A method for manufacturing naturally openable fuselages, each fuselage presenting a bottom, a top, a front end, a rear end, a fuselage axis passing through said front and rear ends, and wherein each fuselage is releasably coupled to one of a plurality of electronic junction modules of a submarine acoustic antenna, the method comprising:
   providing a first shell, a second shell, a first articulation assembly, and a second articulation assembly, the first articulation assembly and the second articulation assembly adapted to articulate the first shell and the second shell with respect to each other between an open position and a closed position, along an articulation axis substantially parallel to said fuselage axis, and a locking system adapted to releasably retain said first and second shells in the closed position over said one of the plurality of electronic junction modules,
   positioning the articulation axis and the locking system respectively close to the bottom and top of the fuselage,
   slidably articulating said first and second shells with respect to each other along said articulation axis, through said first and second articulation assemblies, the first and second shells being adapted to move from each other in first and second opposite directions, along said articulation axis, so that said axial sliding causes, when the fuselage is in the closed position, in a first direction directed rearwards, the automatic locking of said first and second shells on each other, through said locking means, and, in the second direction directed frontwards, the automatic unlocking of said first and second shells, and a natural opening toward the bottom, by downward tilting of the first shell, around said articulation axis,
   providing each fuselage with three wings,
   configuring said three wings in a trihedron configuration, including two top wings and one bottom wing, each wing having a rotation axis,
   engaging each of said rotation axis through the second shell,
   positioning the first shell between one of the top wings and the bottom wing, with said articulation axis extending longitudinally along the bottom of said fuselage, when said first and second shells are in the closed position.

* * * * *

UNITED STATES PATENT AND TRADEMARK OFFICE
CERTIFICATE OF CORRECTION

PATENT NO. : 8,113,135 B2
APPLICATION NO. : 12/134863
DATED : February 14, 2012
INVENTOR(S) : Catherin et al.

Page 1 of 1

It is certified that error appears in the above-identified patent and that said Letters Patent is hereby corrected as shown below:

In the Claims

Column 6, line 66:
Delete the second occurrence of "according to".

Signed and Sealed this
Twelfth Day of November, 2013

Teresa Stanek Rea
*Deputy Director of the United States Patent and Trademark Office*